Patented May 10, 1932

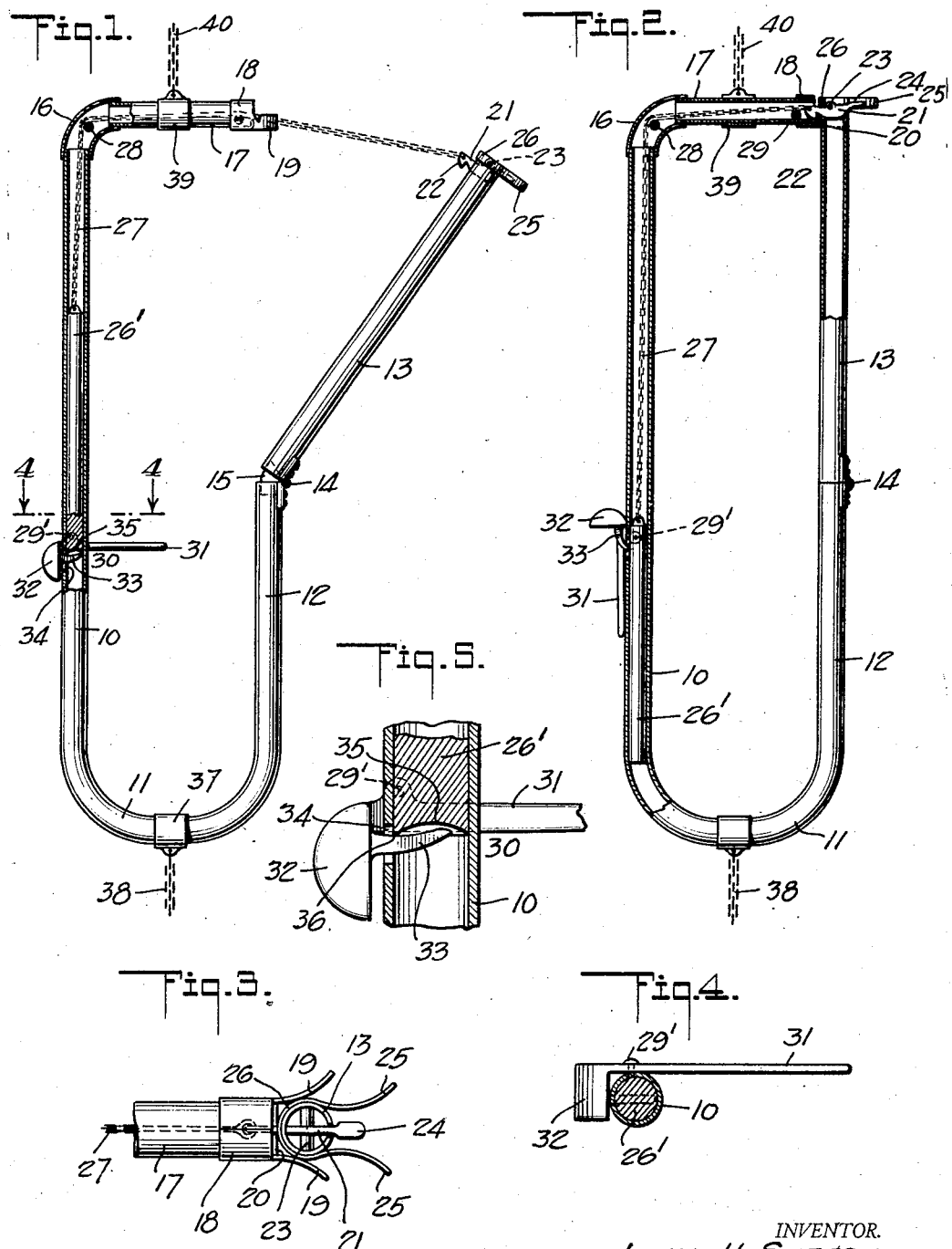

1,857,412

UNITED STATES PATENT OFFICE

JOHN H. SUTTON, OF LOS ANGELES, CALIFORNIA

CATTLE STANCHION

Application filed February 24, 1930. Serial No. 430,933.

My invention relates to cattle stanchions, and has for its primary object the provision of positively acting self-closing means which will be influenced entirely by the animal after the latter has entered the stanchion and lowers its head to feed, so as to firmly lock the stanchion in position about the neck of the animal, thereby eliminating the necessity of manual assistance when applying and locking the stanchion in position upon the animal.

A further object of the invention is to provide a stanchion which is strong, durable, simple and inexpensive of construction, positively acting, and one which can be operated with great saving of time, labor and expense.

A further object of the invention is to provide a stanchion which is so designed and constructed that when applied it cannot be vacated by action of an unruly animal.

A still further object of the invention is to provide means for positioning the stanchion in a stall and for maintaining an open position thereof so that it is immediately in a position to receive the neck of the animal when the animal enters the stall.

In the accompanying drawings,

Figure 1 is a view in side elevation of the stanchion, parts being shown in section for the purpose of clarity and the stanchion being in an open position;

Figure 2 is a similar view showing the stanchion closed;

Figure 3 is a plan view of a portion of the stanchion when closed;

Figure 4 is a section taken on line 4—4 of Figure 1;

Figure 5 is a vertical section through one leg of the stanchion and illustrating on an enlarged scale a position of the trigger with respect to the moving weight when the stanchion is in an open position.

I am particularly desirous of stressing a construction of stanchion which is so formed that a comparatively narrow space is provided for the neck of the animal so as to avoid possibility of an animal backing out of the stall and causing confusion and excitement after the stanchion is applied. I, therefore, employ a stanchion made up almost entirely of hollow steel tubing and, as illustrated, I have organized an arrangement of parts consisting of a vertical leg 10 which extends approximately throughout the length of the stanchion and which at the bottom is curved at 11, where it terminates in a short vertical leg 12, the length of which is approximately one-half of that of the leg 10, the latter and the former being disposed in parallelism. A short leg section 13 is hinged at 14 to the section 12 so that it may be tilted to either of the full line positions shown in Figures 1 and 2 of the drawings. Secured within the upper extremity of the leg section 12 is a metallic reinforcing plate 15 which extends freely into the lower end of the section 13 so as to prevent relative twisting movement of the latter on the former and thereby relieve the hinge 14 of any torsional strains. At the upper end of the long leg 10 is an elbow 16 to which is joined a small section of steel tubing 17. The free end of the tubing 17 is provided with a collar 18, the forward end of which is U-shaped so as to provide relatively flat jaws 19, 19. This collar is provided with a keeper or lug 20 which is disposed in the path of a tilting dog 21, whereby to engage with the nose 22 thereof when the section 13 is in the vertical position illustrated in Figure 2. This dog is pivoted at 23 to the upper end of the section 13 and the tail or manipulating portion 24 of the dog is positioned between the relatively flared jaws 25, 25 of a strap or collar 26 secured to the upper end of the said section 13.

The long leg 10 of the stanchion frame contains a sliding weight 26' to the upper end of which a chain 27 is connected. This chain passes through the elbow 16, over an anti-friction roller 28 within the elbow, thence through the short tubing section 17 and over an anti-friction roller 29 contained therein, and as illustrated the outer end of the chain finds connection with the nose of the tilting dog. Pivoted at 29' to the long leg 10 is a trigger 30, the point of pivotal connection being offset with respect to a line drawn through the longitudinal axis of the leg 10. This trigger is provided with a releasing arm 31 which extends from one side of the pivot 29', while at the opposite side of said pivot the trigger is formed with a weight 32 and a retaining lug 33. The retaining lug is movable in a slot 34 formed in one wall of the leg 10. At this point, reference should be had to Figure 1 of the drawings, wherein it will be observed that the frame section 13 of the stanchion is fully opened and that the weight 26' occupies its upper position of adjustment. Now, it will be observed that the slot 34 occupies a position immediately below the concaved bottom 35 of the weight 26' and that by virtue of the weight 32 the trigger arm 31 occupies a horizontal position where it extends well into the neck-receiving space of the stanchion frame. Also, it will be noted that the lug 33 barely contacts at the point 36 with an extreme edge portion at the base of the sliding weight 26'. At the same time, it supports the entire load of the weight and incident to the position of the pivot 29' the weight cannot descend until the arm 31 is first depressed and the lug 33 retracted from within the leg 10. In this manner, I am able to obtain a very large entrance opening at the top of the stanchion which is ready for the reception of the head of the animal on the animal entering the stall. I have also correlated the respective instrumentalities of the stanchion so as to dispose the arm 31 in a position where it will obstruct the downward movement of the neck of the animal. In this manner, as soon as the animal enters the stanchion and moves its head to feed, the arm 31 is instantly engaged and the trigger mechanism is automatically influenced so as to free the weight 26' and permit it to be lowered in the leg 10, this placing a pulling action upon the chain 27 with a resulting closing of the section 13 where it occupies the full-line position shown in Figure 2. In the just described action of the section 13, the keeper lug 20 automatically engages with the hook or nose of the tilting dog 21.

Now, it is desired that reference be had to Figure 2, wherein it will be observed that the dog 21 is wholly confined or enclosed in the space between the jaws 25, 25, and that the nose of the dog is firmly concealed within the collar 18. In this manner, I have mounted the dog in a position where it cannot possibly contact with the head of the animal which otherwise would probably cause its accidental release from its keeper and an opening of the stanchion.

The bend 11 at the base of the leg 10 is equipped with a clamp 37 which carries a short length of chain 38, the latter adapted to be secured to the bottom of a stall. The frame section 17 is provided with a similar clamp 39, the latter carrying a short chain section 40, which may be secured to the top of the stall. When the stanchion is mounted in the stall as just described and the section 13 is turned to the position shown in Figure 1, the jaws 25, 25, may be engaged with a side post or some other suitable part of a stall so as to stabilize the stanchion or, in other words, hold same firmly in a position of open adjustment.

I have provided a stanchion which is entirely automatic in action, after the leg section 13, of course, is manually turned to the full-line position shown in Figure 1. At this time the space between the sides of the stanchion is comparatively wide at the top in order to freely accommodate the head of the animal. I have also provided an arrangement whereby the space for the reception of the neck is more or less constricted when the stanchion is closed to the position shown in Figure 2, thereby making it impossible for the animal to back out or jump through the stanchion. No manual assistance need be called into play when applying the stanchion and because thereof I am able to effect great saving of time, labor and expense. When the stanchion is in the open position shown in Figure 1, the respective jaws 25—25 may be associated with one of the posts of a stall so as to prevent the stanchion from turning about a vertical center, thus insuring quick entrance of the head of the animal through the neck-receiving space between the respective legs 10 and 13.

I claim as my invention:

A cattle stanchion comprising a frame including a plurality of spaced apart legs, one of which is provided with a tilting section, a dog on the tilting section, a keeper on the other leg, said keeper disposed in the path of movement of the dog, a sliding weight in said other leg, a flexible connection between the weight and the said dog, and a weighted trigger carried by said other leg and having a portion disposed with respect to the sliding weight so as to engage therewith and hold same in a position of suspension, and means on the trigger extending into the neck-receiving space of the frame and adapted to be engaged by the neck of an animal so as to release the trigger from the weight and permit same to descend and exert a pull upon the flexible connection and thereby move the tilting leg section to a closed position while establishing an interlocked connection between the aforementioned keeper and its co-acting dog.

JOHN H. SUTTON.